United States Patent
Amendola et al.

(10) Patent No.: US 7,346,435 B2
(45) Date of Patent: Mar. 18, 2008

(54) METHOD FOR LOADING SOFTWARE

(75) Inventors: Sandro Amendola, Bonn (DE);
Lawrence Augustin, Ulm (DE);
Sandra Schneider, Stuttgart (DE);
Peter Unruh, Bonn (DE)

(73) Assignee: DaimlerChrysler AG, Stuttgart (DE)

( * ) Notice: Subject to any disclaimer, the term of this patent is extended or adjusted under 35 U.S.C. 154(b) by 790 days.

(21) Appl. No.: 10/343,458

(22) PCT Filed: Jul. 19, 2001

(86) PCT No.: PCT/EP01/08355

§ 371 (c)(1),
(2), (4) Date: Aug. 20, 2003

(87) PCT Pub. No.: WO02/10903

PCT Pub. Date: Feb. 7, 2002

(65) Prior Publication Data

US 2004/0039500 A1    Feb. 26, 2004

(51) Int. Cl.
*G06F 7/00* (2006.01)
*G06F 9/44* (2006.01)

(52) U.S. Cl. .............. 701/1; 701/29; 701/33; 717/168; 717/174; 717/177; 717/172

(58) Field of Classification Search .......... 701/1, 701/29, 33; 717/168, 174, 177, 172
See application file for complete search history.

(56) References Cited

U.S. PATENT DOCUMENTS

2002/0143801 A1 * 10/2002 Okamoto et al. .......... 707/203

FOREIGN PATENT DOCUMENTS

| DE | 43 34 859 A1 | 10/1993 |
|----|--------------|---------|
| DE | 196 25 002 A1 | 6/1996 |
| JP | 11-096082 A | 4/1999 |
| JP | 2001-123874 A | 5/2001 |

OTHER PUBLICATIONS

Japanese Office Action Dated Aug. 25, 2005 including an English translation.

* cited by examiner

*Primary Examiner*—Thomas Black
*Assistant Examiner*—Marie A Weiskopf
(74) *Attorney, Agent, or Firm*—Crowell & Moring LLP

(57) ABSTRACT

In a method for loading software into a target appliance in a vehicle control system having a plurality of appliance, the loading process for one or more software modules is subdivided into task elements (at least one monitoring appliance task, one update appliance task and one receiving appliance task), and performance of the respective task elements is assigned to the target appliance, other appliances and/or to a control appliance outside the vehicle control system. The monitoring appliance task includes processing and passing on the control commands for the loading of the software module from outside the vehicle control system; the update appliance task includes controlling the loading of the software module between the target appliance, the appliances and/or the control appliance; and the receiving appliance task includes provision of an interface for the software module which is to be loaded from outside the vehicle control system.

14 Claims, 2 Drawing Sheets

METHOD FOR LOADING SOFTWARE

BACKGROUND AND SUMMARY OF THE INVENTION

This application claims the priority of German patent document 100 37 397.6, filed 1 Aug. 2000 (PCT International Application No. PCT/EP01/08355, filed 19 Jul. 2001), the disclosure of which is expressly incorporated by reference herein.

The invention relates to a method for loading software into a target appliance in a vehicle control system having a plurality of appliances, and to a vehicle control system for carrying out the method.

German patent document DE 43 34 859 A1 discloses a device for programming electronic controllers in a motor vehicle, which is intended for initialization of the controllers on the production line. The controllers are connected to one another, with one of them being able to communicate with an external programmer via an existing transmitting/receiving device, for example an infrared locking system.

During initialization of the appliances, each appliance to be programmed must have sufficient computation power and sufficient free memory to carry out the tasks which occur during the programming process. The loading of new software versions, that is to say so-called updates, presents more stringent requirements than those during initialization since it may be necessary to back up already loaded software and the amount of free memory space is reduced since it is occupied by operating data.

These more stringent requirements have to be satisfied, for example, by providing greater computation power and larger memories for appliances in a vehicle control system. At the same time, vehicle control systems are subject to considerable cost pressure so that appliances which are intended to be fitted in large-scale production, in particular, must be designed to have as low a cost as possible. Until now, loading of software in vehicle control systems has thus been restricted to the initialization of specific appliances on the production line and to the updating of specific appliances, which are generally provided as special equipment, such as navigation systems, which receive new data records via CDs (compact discs).

German patent document DE 196 25 002 A1 discloses a vehicle communications system, in which appliance units for transmitting, receiving, detecting and/or processing data can be associated in a flexibly controllable manner with various telemetry applications. This is intended to provide increased flexibility for carrying out telemetry applications at low cost, with the intention of avoiding redundant equipping of the vehicle with identical appliances for different telemetry applications.

One object of the invention is to provide a method for loading software into a target appliance in a vehicle control system and of providing a vehicle control system for carrying out the method, which places only minor requirements on the performance of the target appliance.

This and other objects and advantages are achieved by the method and apparatus according to the invention, in which the process of loading a software module is sub-divided into task elements, the performance of which is assigned to a target appliance, to appliances in the vehicle control system and/or to a control apparatus outside the vehicle control system. Accordingly, all of the tasks need not be carried out by a single apparatus while loading the software module. It is thus possible to distribute the load, for example with regard to the computation performance and memory capacity, on the basis of the performance of the individual appliances. Most appliances in a vehicle control system are not part of the standard equipment. Intelligent distribution of the task elements makes it possible to prevent the small number of standard appliances having to be upgraded (and thus made more expensive) in order to allow a software update. The definition of task elements corresponds to the definition of logical appliances. When the method is carried out, the task elements or the logical appliances are then assigned to the appliances which are actually physically present.

The task elements include i) a monitoring appliance task, which in turn includes processing and passing on control commands for the loading of the software module from outside the vehicle control system, ii) an update appliance task, which includes control of the process of loading the software module between the target appliance, the appliances and/or the control appliance, and iii) a receiving appliance task, which includes provision of an interface for the software module to be loaded from outside the vehicle control system. Subdivision into these task elements is particularly suitable for a vehicle control system since this takes account of specific boundary conditions that occur in a vehicle control system. For example, vehicle control systems do not have powerful central computers which could generally be used to accept the main load during the loading process. In fact, different equipment variants differ considerably in terms of the performance of the installed appliances, so that variable assignment of the task elements is the only way to allow the software to be loaded in different equipment variants. The high degree of flexibility of the method allows it to be used over a number of model cycles of a manufacturer.

The provision of a monitoring appliance task allows different appliances to be used as the interface to the outside world without having to modify the method for loading a software module. For example, the loading of one or more software modules can be controlled by an external diagnosis appliance or else by an input device in the vehicle itself. The same method can thus be used for updating controllers from the diagnosis computer and for updating a navigation system from the controller in the vehicle. The flexible assignment for carrying out the update appliance task also makes it possible to provide less powerful appliances in the vehicle control system with new software modules, since the control of the process of loading the software module can be assigned to a more powerful appliance.

The provision of a receiving appliance task allows a single physical appliance to be used for updating different appliances. The method can also be used without modification if software is intended to be loaded via an optionally provided mobile radio or CD ROM interface rather than via a diagnosis interface which is provided, for example, in the standard equipment. When different data transmission rates are used outside the vehicle control system and in the networked vehicle control system, the receiving appliance task may include not only the reception of the data but also the temporary storage of the received data.

The definition of a configuration manager task allows computation-intensive compatibility checking during the loading of a software module in the case of vehicle control systems having a standard outfitting to be moved elsewhere and, for example, to be transferred to a diagnosis appliance. On the other hand, in variants with better equipment, the compatibility check can be carried out within the configuration manager task in the vehicle itself, for example by the customer himself when loading new software for a navigation system.

Since the data for configuration management are carried directly together with the software in a version line and in a list of requirements, there is no need for costly central data storage. Only the evaluation of the data that is also carried is performed centrally by the appliance to which the process of performing the configuration manager task has been assigned. Only as many central components as are necessary are therefore provided for compatibility checking, and the method is thus particularly suitable for a vehicle control system. Self-testing of the software configuration of the vehicle control system is also possible.

The provision of a backup appliance task, which includes backing up at least some of the software modules in the target appliance within the vehicle control system, allows previously loaded software to be backed up even for software updates which are carried out by the customer himself (for example from the CD ROM without any connection to an external diagnosis appliance, or via mobile radio for a software update). The flexible assignment of the backup appliance task makes it possible to choose an appliance which is particularly suitable for this purpose depending on the equipment variant.

The assignment of the process for carrying out the task elements is advantageously made as a function of the computation performance required for the task elements, of the memory space required for the task elements and/or of the time which is required for the storage of data in the target appliance and in the appliances in the vehicle control system. This allows computation-intensive, memory-intensive, and/or time-critical task elements to be assigned to the most suitable of the respective appliances.

Since a data transmission is made secure by cryptographic scrambling only outside the vehicle control system, the complexity can be reduced considerably in comparison to so-called end-to-end protection, so that standard configurations of vehicle control systems can be designed to be simpler, despite being capable of carrying out an update. In particular, less computation power is required within the vehicle control system and, in general, the administrative complexity is decreased since fewer cryptographic keys need to be administered.

The invention also provides a vehicle control system in which the data required for carrying out a compatibility check within a configuration manager task are carried together with the software. For this purpose, the software modules which have already been loaded in the respective appliances in the vehicle control system each have a version line and a list of requirements. Such vehicle control system allows a compatibility check to be carried out for a software module to be loaded, without any complex central data storage, since the required data are attached to the software modules themselves. A vehicle control system such as this is thus particularly suitable for production in different equipment variants, including standard configurations.

Since the vehicle control system can be operated by means of a control appliance outside the vehicle control system, the configuration manager task can be carried out outside the vehicle control system, thus reducing the requirements for the appliances in the vehicle control system.

However, it is also advantageous to provide an appliance which is suitable for carrying out the configuration manager task in the vehicle control system, since a compatibility check, specifically to determine whether the vehicle control system satisfies the hardware and software requirements for the software module to be loaded and whether the software module to be loaded satisfies the requirements for operation of the vehicle control system, can be carried out in the vehicle itself. This is advantageous, for example, when the data are transmitted by mobile radio or from a CD ROM when an update is intended to be carried out without connecting any external appliance.

Other objects, advantages and novel features of the present invention will become apparent from the following detailed description of the invention when considered in conjunction with the accompanying drawings.

DETAILED DESCRIPTION OF THE DRAWINGS

Figure 1:
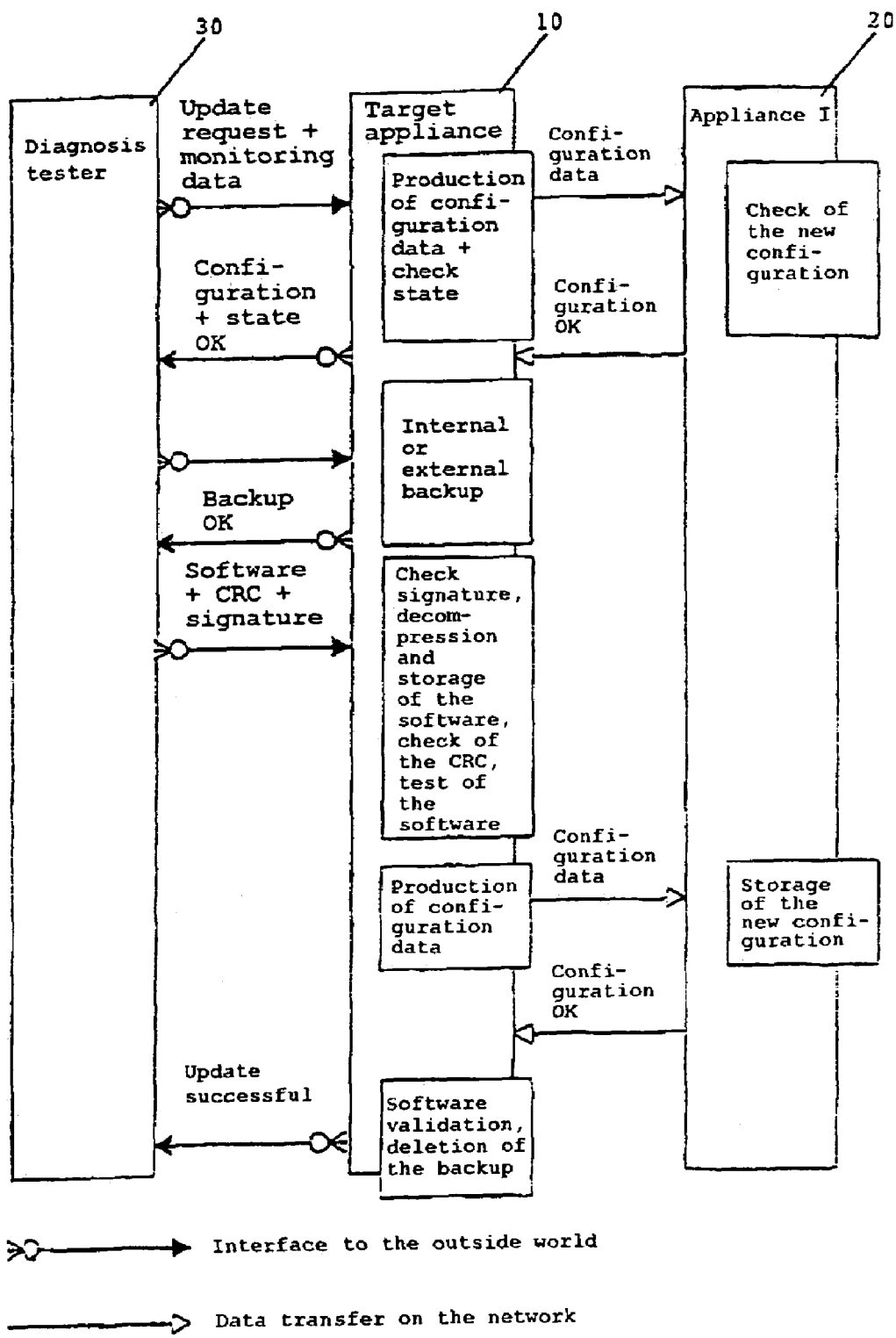
FIG. 1 is a schematic illustration of a first preferred embodiment of the method according to the invention and of the vehicle control system according to the invention.

FIG. 1 shows, schematically, vehicle control system and the method according to a preferred embodiment of the invention. The vehicle control system is indicated in FIG. 1 by a target appliance 10 and an appliance I 20, which are networked to one another. (To make the illustration clearer, no further appliances in the vehicle control system are illustrated.) A control appliance outside the vehicle control system is represented by a diagnosis tester 30, which is connected to the vehicle control system. In the illustrated embodiment, the diagnosis tester 30 carries out a monitoring appliance task, by processing and passing on control commands for loading the software module, outside the vehicle control system. The diagnosis tester 30 thus represents the interface to the outside world, via which an operator causes the software module to be loaded and receives acknowledgments related to the progress of the method.

The software module is intended to be loaded in the target appliance 10. The target appliance 10 thus carries out an update appliance task by controlling the loading process of the software module between the target appliance 10 and the appliance 120 and the diagnosis tester 30, a receiving appliance task, providing an interface for the software module to be loaded from outside the vehicle control system (namely from the diagnosis tester 30), as well as a backup appliance task, by backing up software modules that have already been loaded into the target appliance 10 before the new software module is loaded.

The appliance I 20 carries out a configuration manager task by checking whether the vehicle control system satisfies the hardware and software requirements for the software module to be loaded, and whether the software module to be loaded satisfies the requirements for operation of the vehicle control system.

Thus, in the present case, various task elements related to the loading process are assigned to different appliances (the diagnosis tester 30, to the target appliance 10 and to the appliance I 20). In other words, the diagnosis tester 30 is assigned the tasks of a monitoring appliance, the target appliance 10 is assigned the tasks of a target appliance, an update appliance, a receiving appliance and a backup appliance, and the appliance I 20 is assigned the tasks of a configuration manager. The computation and memory load for the update process is thus distributed on the basis of the capabilities of the individual appliances.

The update process is started by an update request from the diagnosis tester 30. Together with the update request, the diagnosis tester 30 sends monitoring data to the target appliance 10. Within the update appliance task, the target appliance 10 uses this monitoring data and its internal status to generate configuration data for configuration management.

This configuration data is sent to the appliance I 20 which then, within the configuration manager task, checks whether the new configuration is or is not compatible with the overall system, and in particular whether the software module to be loaded satisfies the requirements for the vehicle control system, and vice versa. The appliance I 20 sends this information to the target appliance 10. In the illustrated situation, the checking of the new configuration has ended with a positive result, so that the appliance I 20 sends the information "Configuration OK" to the target appliance 10.

The target appliance 10 also checks whether its internal state allows a software update, and whether the memory space required for the update process is available in the target appliance 10. Within the updated appliance task, the target appliance 10 then sends the acknowledgment "Configuration and State OK", indicating that an update is possible, to the diagnosis tester 30.

The appliance 10 uses the monitoring data transmitted together with the update request by the diagnosis tester 30 within the monitoring appliance task to identify which parts of the software must be backed up before loading the new software module. Within the backup appliance task, the target appliance 10 then backs up the already loaded software. This backup process can be carried out within the vehicle control system, for example in the target appliance 10 itself, by moving it to another appliance in the vehicle control system, or externally for example by means of a backup in the diagnosis tester outside the vehicle control system. The process of backing up the already loaded software is initiated by once again transmitting an update request and backup command from the diagnosis tester 30. Once the backup process has been completed, the target appliance 10 sends back the message "Backup OK" to the diagnosis tester 30.

Once the backup process has been successfully completed, the target appliance 10 receives, within the update appliance task, the new software module together with a checksum, for example CRC, and a signature. The target appliance 10 temporarily stores the new software module and thus carries out a receiving appliance task, by providing an interface between the diagnosis tester 30 outside the vehicle control system and the vehicle control system itself. For example, the new software module can be transmitted from the diagnosis tester 30 to the target appliance 10 at a different data transmission rate than that used in the vehicle control system itself, to be precise between the target appliance 10 and the appliance I 20. The temporary storage of the new software module means that the incoming data are buffered and can be passed on at the data transmission rate that is used in the vehicle control system.

The new software module is decompressed, the signature is checked and the new software module is stored in the target appliance 10. A checksum (for example CRC) is calculated and checked. Furthermore, the successful installation of the new software module is tested.

If the checks of the signature, the checksum and the installation are successful, the target appliance 10 produces, within the update appliance task, configuration data and sends this data to the appliance I 20 which, within the configuration manager task, stores the new configuration, which is now up to date. Once the configuration has been stored, the appliance 120 sends an acknowledgment "Configuration OK".

After receiving this acknowledgment from the appliance I 20, the target appliance enables the installation of the new software module. This is done by the target appliance 10 identifying the new software module as being valid and by erasing the previously stored old software.

Finally, the update appliance passes an acknowledgment of the successful software update to the monitoring appliance, in the present case to the diagnosis tester 30. Successful completion of the update can then be indicated on the diagnosis tester 30 for an operator.

Figure 2:
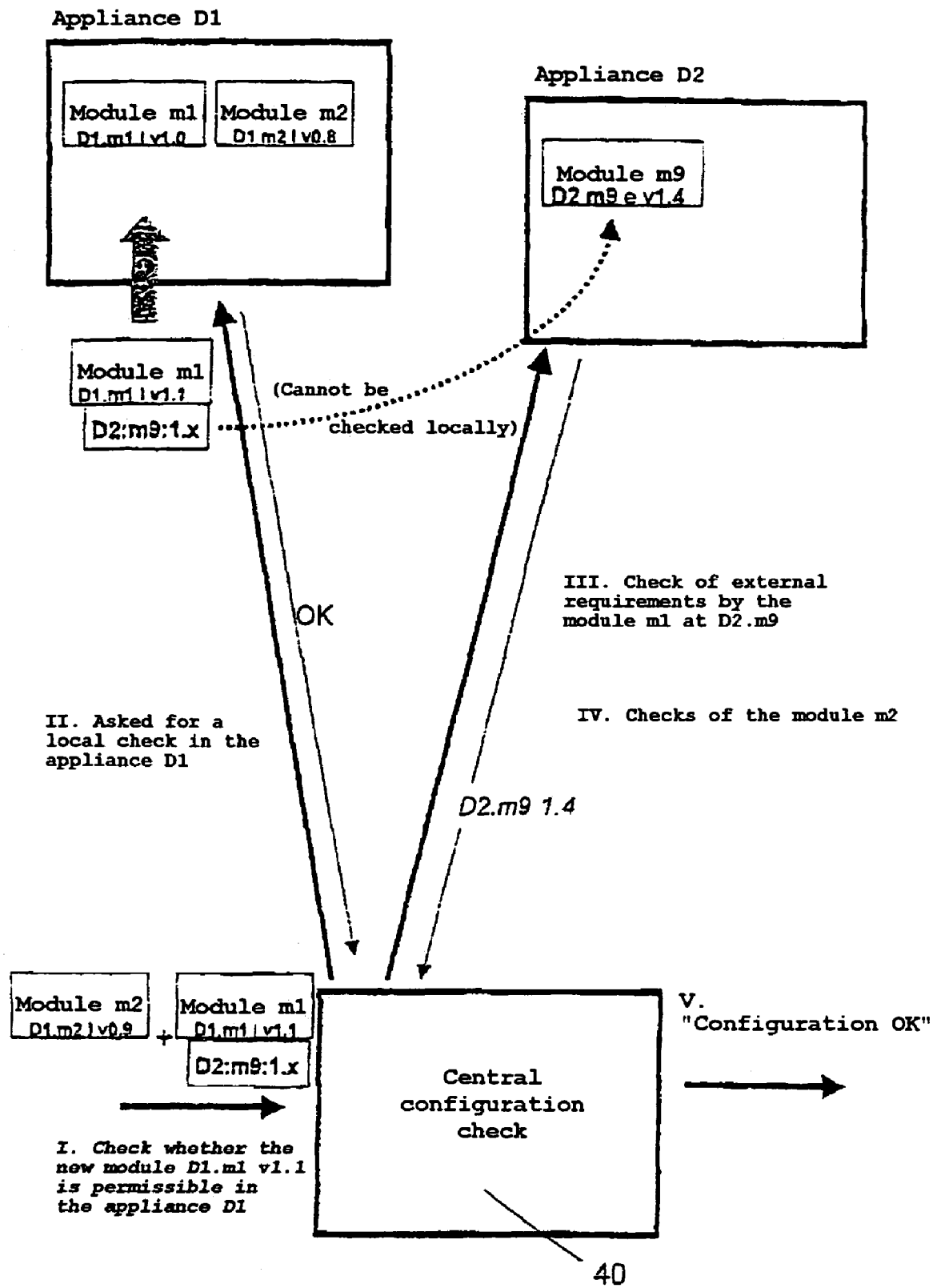
FIG. 2 is a schematic illustration of the checks which are carried out in the course of the configuration manager task in a further preferred embodiment of the invention.

One preferred sequence for a configuration check for a further embodiment of the method according to the invention for loading software using a vehicle control system according to the invention will be explained in the following text with reference to FIG. 2. Each software module is a software unit which can be interchanged and/or newly loaded. Each software module has a version line which includes the title of the target appliance, the module name, an identification for local or external use and the version number as well as, optionally, further details. In the situation where the software modules m1 and m2 are to be loaded as shown in FIG. 2, the title of the target appliance is D1 and one software module has the name m1, indicating exclusively internal use by the letter l and the software module m1 is to version v1.1. The version line of the software module m1 accordingly reads D1.m l v1.1.

The software module m1 also includes therein a list of requirements for other software modules, including identifications for appliances to which access is intended from the software module m1 to be loaded, the titles of the software modules which are required by the software module m1 to be loaded in the appliances to which access is intended, and the version number of the required software modules. In the case of the software module m1, access is intended to an appliance D2 in which the software module m1 to be loaded requires version 1.x of a software module m9. The list of requirements for the software module m1 is accordingly D2.m9 1.x.

The software modules included in the list of requirements must already have been loaded in the stated version, in the vehicle control system. The software modules m1 and m2 to be newly loaded are checked in the configuration check in an appliance 40. The appliance 40 is located within the vehicle control system, although the configuration check can also be carried out by an external appliance. Compatibility of the software module m1 with the vehicle control system is now checked by checking the lists of requirements for the software modules which have already been loaded in the vehicle control system, in a first check. As can be seen from the illustration in FIG. 2, the list of requirements for the software module m2 in the appliance D1 is empty, so that the module m2 does not place any requirements, for example, on the software module m1. The software module m1 is also not available for external use from the appliance D1, as is indicated by the letter l in the version line of the module m1. Further software modules on other appliances, that is to say the module mg on the appliance D2 in the illustrated case, therefore have no requirements for the software module m1.

In a second check, the requirements of the software modules m1 and m2 to be loaded on the software modules which have already been loaded in the vehicle control system are checked. This is done using the list of requirements for the software module m1 or m2. In the example shown in FIG. 2, based on its list of requirements for the appliance D2, the software module m1 requires version 1.x of the software module m9 (that is, the second digit of the version number is undefined). Within the configuration manager task, the appliance 40 compares the list of requirements of the software module m1 with the version line of the software module x1 which has already been loaded in the appliance D2. The version line of the software module x1 is D2 m9e v1.4. The version line includes the title of the software module m9 as well as the letter e, which represents external use of the software module m9 in the appliance D2. The software module m9 in the appliance D2. The software module m9 in the appliance D2 is to version v1.4. A comparison of the list of requirements D2.m9 1.x of the software module m1 with the version line m9 e v1.4 of the software module m9 shows that the requirements of the software module m1 are satisfied by the software module m9. Analogously, m2 is then checked, and all the requirements are satisfied in this case as well. As a consequence of this the appliance 40 can output an "OK" message in order to end the configuration check, indicating that the new software module m1 can be loaded into the appliance D1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for loading software into a target appliance in a vehicle control system having a plurality of appliances, comprising:
   subdividing the loading process for at least one software module into task elements, including at least one monitoring appliance task, one update appliance task and one receiving appliance task; and
   assigning performance of each task element to a respective one of a target appliance, other appliances in said plurality of appliances in said vehicle control system, and a control appliance situated outside the vehicle control system; wherein
   the monitoring appliance task includes processing and passing on control commands for loading of a first software module from outside the vehicle control system;
   the update appliance task includes controlling the loading of the software module between the target appliance, the other appliances and/or the control appliance; and
   the receiving appliance task includes provision of an interface for the first software module which is to be loaded from outside the vehicle control system.

2. The method for loading software according to claim 1, comprising further subdivision of the loading process for the first software module into a configuration manager task, which includes a check as to whether the vehicle control system satisfies the hardware and software requirements of the software module, and whether the first software module satisfies the requirements for operation of the vehicle control system.

3. The method for loading software according to claim 2, wherein
   each one of first and second software modules to be loaded is provided with one version line and a list of requirements;
   the version line has a title for the software module to be loaded, an identification for the target appliance, an identification for internal or external use of a software module to be loaded in the target appliance, as well as a version number for the software module to be loaded;
   the list of requirements includes identifications for appliances to which access by a particular software module to be loaded is envisaged, titles of software modules which are required by the software module to be loaded in the appliances to which access is intended, and version numbers for the required software module;
   the configuration manager task includes a first check, in which requirements for software modules already loaded in the target appliance and in the other appliances are checked against the software module to be loaded, using the version line of the software module to be loaded and using lists of requirements of the already-loaded software modules;
   the configuration manager task further includes a second check, in which requirements for the software module to be loaded are checked against software modules that have already been loaded in the target appliance and in the appliances, using the list of requirements of the software module to be loaded and version lines of the already-loaded software modules.

4. The method for loading software according to claim 2, wherein the configuration manager task is carried out by an appliance in the vehicle control system.

5. The method for loading software according to claim 2, the configuration manager task is carried out by the control appliance outside the vehicle.

6. The method for loading software according to claim 1, comprising a further subdivision of the loading process for the software module into a backup appliance task, which includes backing up of at least some of the software modules which have already been loaded in the target appliance, within the vehicle control system.

7. The method for loading software according to claim 1, wherein performance of the task elements is assigned as a function of at least one of computation power required for the task elements, memory space required for the task elements, and time required in the target appliance and in the other appliances for the storage of data.

8. The method for loading software according to claim 1, wherein security for data transmission is provided by cryptographic scrambling only outside the vehicle control system.

9. A vehicle control system for carrying out a method according to claim 1, wherein:
   to carry out a configuration manager task which includes a check as to whether the vehicle control system satisfies hardware and software requirements for a software module to be loaded, and whether the software module to be loaded satisfies the requirements for operation of the vehicle control system, software modules which have already been loaded in a respective appliance in the vehicle control system each include a version line and a list of requirements;
   the version line has a title for the already-loaded software module, an identification for internal or external use of the already-loaded software module in the respective appliance and a version number for the already-loaded software module; and
   the list of requirements has identifications for appliances to which access by the already-loaded software module is intended, titles of software modules which are required by the already loaded software module in the appliances to which access is intended, as well as version numbers of the required software modules.

10. The vehicle control system according to claim 9, wherein the vehicle control system can be operated by a control appliance outside the vehicle control system to perform the configuration manager task.

11. The vehicle control system according to claim 9, wherein an appliance suitable for carrying out the configuration manager task is provided in the vehicle control system.

12. A method for loading software into a target controller in a vehicle control network that includes a plurality of other controllers, said method comprising:
dividing the loading process for loading at least one software module into task elements;
loading said at least one software module into said target controller by causing at least one of said task elements to be performed by said target controller, and at least one other task element to be performed by one of said other controllers in said vehicle control network, which communicates with said target controller via said vehicle control network.

13. A method according to claim 12, wherein said task elements include a monitoring appliance task, an update appliance task and a receiving appliance task.

14. A method according to claim 13, wherein:
said task elements further include a configuration manager task that checks whether the vehicle control system satisfies the hardware and software requirements of the at least one software module, and whether the at least one software module satisfies requirements for operation of the vehicle control system; and
processing for performing said configuration manager task is performed by one of said other controllers.

* * * * *